Jan. 23, 1934.  W. L. C. HUXTER  1,944,321
VENTILATOR
Filed Feb. 27, 1933   2 Sheets-Sheet 1
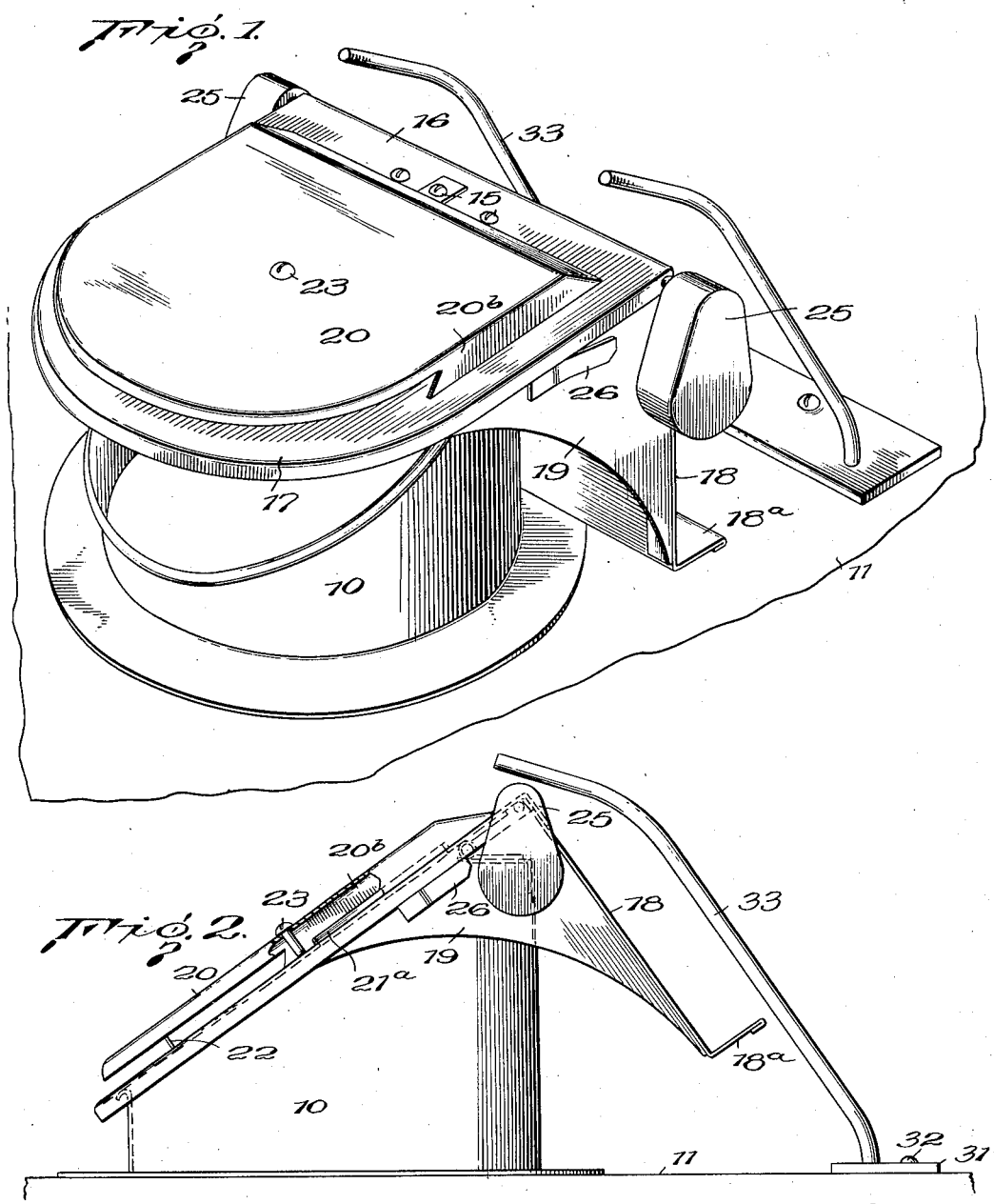
Inventor
Walter L. C. Huxter,
By Church + Church
His Attorneys

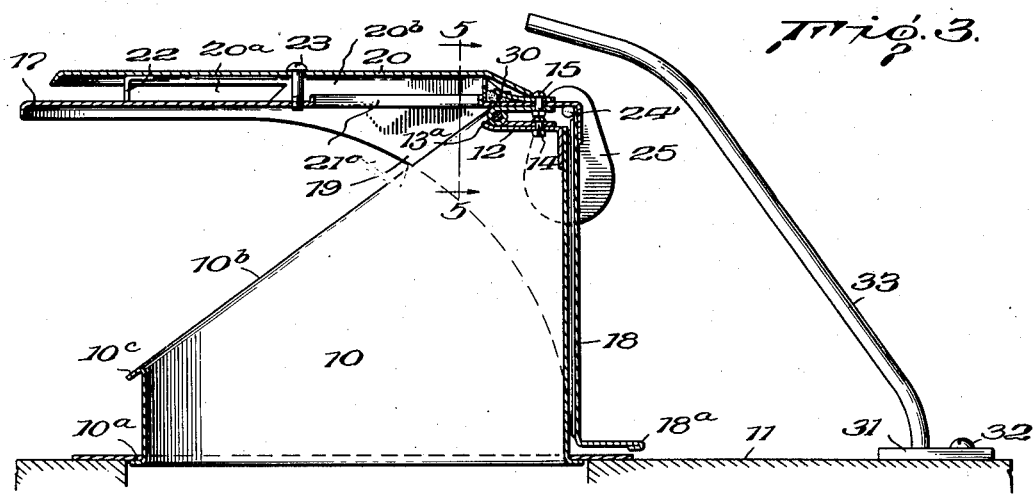
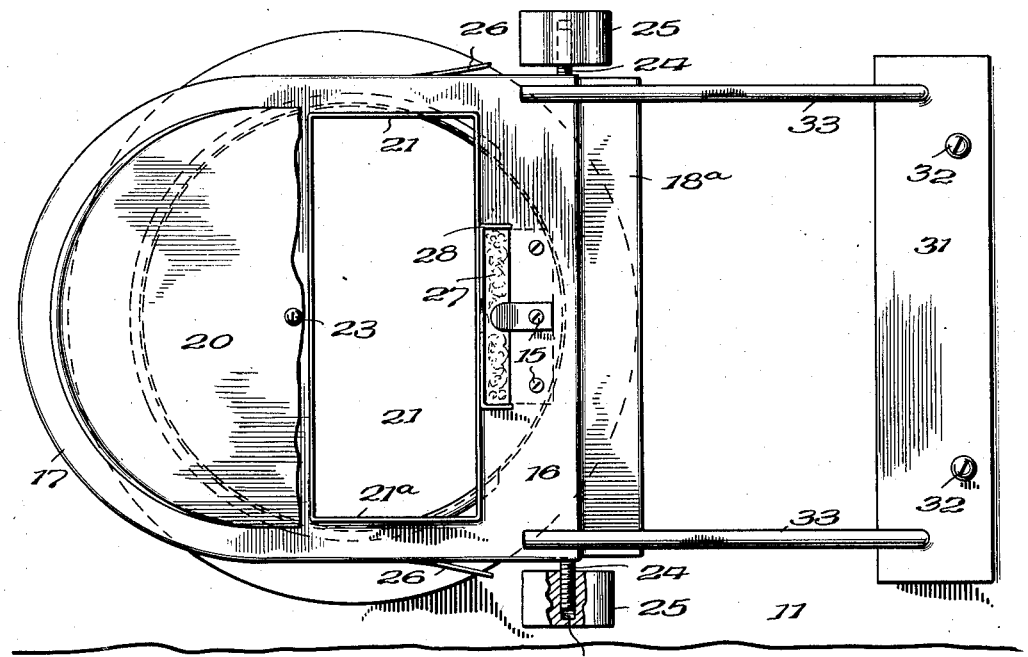
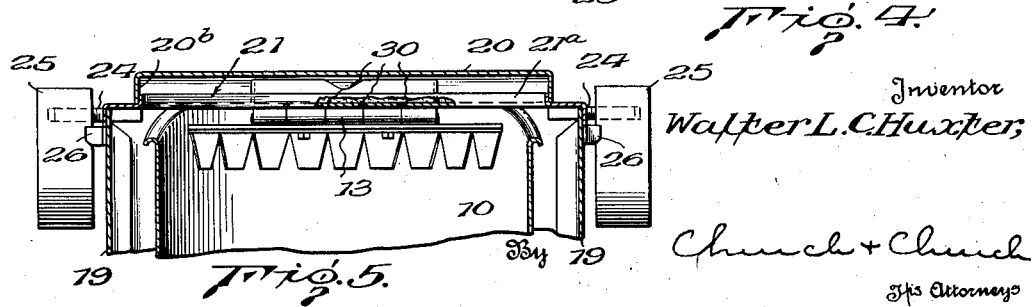

Patented Jan. 23, 1934

1,944,321

UNITED STATES PATENT OFFICE 1,944,321

VENTILATOR

Walker L. C. Huxter, Richmond, Va.

Application February 27, 1933. Serial No. 658,857

12 Claims. (Cl. 98—20)

My invention relates to improvements in ventilators, and has to do, more particularly, with improvements in devices for exhausting air from buses and similar moving vehicles.

It is a fact well known to every city dweller relying upon bus or street car transportation, that such public conveyances are inadequately ventilated during rush periods in inclement weather. In the case of buses powered by gas engines the problem has reached serious proportions since, in such vehicles, despite careful sealing-off of the engine compartment from the passenger body, it has been found practically impossible to prevent the admission of engine fumes. With the occurrence of carbon-monoxide poisoning of bus drivers and passengers in many of our larger cities, the general health of the bus riding population has been a matter of serious concern and is receiving the attention of public boards of health throughout the entire country. During inclement weather, despite public health regulations requiring the maintenance of ventilation in public conveyances by means of partially opened windows or specially provided ventilators, the drafts induced by such means are exceedingly objectionable to the passengers and either through intent or inadvertence, adequate ventilation is the exception rather than the rule.

With the above general condition in mind, my invention has, for its primary object, the provision of an exhaust ventilator which, properly installed, will effect the withdrawal of spent air and fumes from the vehicle without inducing drafts about the passengers.

It is also an object of my invention to provide an exhaust ventilator for moving vehicles which is automatic and requires no adjustment or attention, and is therefore, not subject to tampering or being placed out of commission.

It is an object of my invention to provide an exhaust ventilator for outdoor vehicles which is not subject to injury or disturbance by overhanging roadway objects, such as tree branches.

It is an object of my invention to provide an exhaust ventilator for vehicles which will not allow the entry of rain, leaves or other debris, either during motion or when the vehicle is at rest.

It is an object of my invention to provide an exhaust ventilator for vehicles which will permit ventilation by normal convection when the vehicle is at rest.

It is an object of my invention to provide an exhaust ventilator for vehicles which will operate freely without frequent lubrication of its moving parts.

It is an object of my invention to provide an exhaust ventilator for vehicles which is of attractive appearance.

It is an object of my invention to provide an exhaust ventilator for vehicles which is of simple, trouble-free construction, durable, and is inexpensive to manufacture.

Further objects, and objects relating to details and economies of construction and operation will more definitely appear from the detailed description to follow. In one instance, I accomplish the objects of my invention by the means described in the following specification. My invention is clearly pointed out in the appended claims. A preferred embodiment of my invention is illustrated in the accompanying drawings, in which:

Figure 1 is a perspective view of a preferred form of ventilator embodying my invention, the ventilator being shown in open position;

Fig. 2 is a view in side elevation of the same ventilator in closed position, a portion of ventilator cap being broken away to disclose details of internal construction;

Fig. 3 is a vertical sectional view through the same ventilator in open position;

Fig. 4 is a top view of the same ventilator in open position, portions thereof being broken away to show details of internal construction; and Fig. 5 is a fragmentary sectional view taken on the line 5—5 of Fig. 3, and disclosing details of the counterweighted hinge construction of the movable hood.

The same reference numerals denote the same parts throughout the several views.

In its broader aspects, my invention, as embodied, consists in an upstanding stack adapted for mounting upon the roof or similar surface of a vehicle, provided with a passage through which spent, or otherwise fouled air, may be withdrawn, which stack is covered by a hood consisting of a cap portion normally seatable upon the top edge of the stack proper and a vane portion which is subject to being shifted rearwardly by the air through which the vehicle is moving and which vane portion is so associated with the cap portion of the hood as to effect unseating of the latter from the stack during motion of the vehicle. The hood serves, among other things, two primary functions; first, the prevention of rain or debris from entering the vehicle through the stack, and second, the provision of high vacuum in the stack when the vehicle is moving, thus effecting thorough scavenging of the interior of the vehicle.

More specifically, and with particular reference to the preferred embodiment of my invention illustrated in the accompanying drawings, my ventilator consists of a stack 10 having a flanged base 10a adapted to be secured to the roof 11 of a bus, street car or other vehicle, by bolts, welding, or other means (not shown). The upper and forward edge of the stack 10 is provided with a rearwardly extending flange 12 to which a hinge 13 is secured by bolts 14. The portion of the stack rearward of the flange 12 is inclined downwardly, as indicated at 10b, and is provided with an integral radially outwardly extending lip 10c. To the upper plate of the hinge 13 is attached, as by bolts 15, a hood member 16, which is pivotally movable on the axis of the hinge pintle 13a. The hood member 16 consists essentially of a cap portion 17 which is seatable upon the lip 10c of the stack as shown in Fig. 2, and a depending vane portion 18 which faces the front of the vehicle. A web or gusset plate 19 bridges the edges of the cap and vane portions 17 and 18 at each side of the stack and a flanged supplemental cover plate 20 spacedly covers an aperture 21 formed in the cap portion 17 of the hood and permits ventilation through the stack when the cap portion is seated, yet prevents the ingress of rain or debris. The flange of the cover plate 20 is cut away as shown at 20a to provide the ventilating spacing referred to and the lug 22 and flange 20b of the cover 20 provide a footing upon which the cover is supported by reason of the clamping action of the assembly bolt 23 passing through cover 20 and cap 17. As shown, the aperture 21 is defined by an upstanding flange 21a and the fit of the forward edge of the cover plate 20 upon the cap 17 is such that no rain can be driven into the stack 10 therethrough. The weight and extent of the hood portions disposed rearward of the hinge pintle 13a, and those hood portions disposed forward of the pintle 13a, is such that the cap portion 17 will rest lightly upon the lip 10c of the stack when the vehicle is at rest, and, as has been pointed out, ventilation may take place through the stack 10, aperture 21 and cutaway portion 20a of the cover by normal convection. However, when the vehicle is in motion, the impact of air upon the vane 18 is such as to shift the vane rearwardly and thus effect unseating of the cap portion 17 from the lip 10c of the stack. Such unseating or lifting of the cap portion 17 of the hood increases the effective leverage of the portions of the hood to the rear of the pintle 13a and decreases the effective leverage of those portions forward of the pintle 13a. As a result, considerable air pressure must be exerted upon the vane 18 in order to completely lift the cap portion to its fully open or substantially horizontal position shown in Figs. 1 and 2. For the purpose of lessening the air pressure necessary to effect complete opening of the ventilator, and thus effecting this condition at a reduced vehicle speed, there is provided a variable counterpoise consisting of a pair of threaded studs 24 secured to the hood forward of the pintle 13a, and a pair of more or less pear-shaped weights 25 swung on said studs. The weights 25 are provided with bores 25a extending partially through their upper portions and are threaded to receive and be retained by said studs. The weights 25 are not completely threaded upon the studs 24 but are free to swing thereon. A small reservoir for graphite, or other lubricant is therefore provided by the portion of the bores 25a not filled with the studs 24. Attached to the outer surface of each gusset plate 19, as by welding, is a depressible spring finger 26 which precludes further threaded association or dissociation of the weights 25 with the studs 24.

While the hinge 13 may be of the self-lubricating type, for purposes of free action and economy of construction, I prefer to employ conventional structure and provide for its lubrication by a simple oiler of low cost which will provide lubrication for a long period. The lubricator disclosed consists of a felt strip 27 saturated with oil and retained in shielded position beneath the cover plate 20 by means of a receptacle consisting of an upstanding flange 28 on the cap portion 17 and a clip 29 secured by one of the hinge bolts 14. Oil yielded by the felt strip 27 gains access to the hinge 13 through any of three perforations 30 formed in the cap portion 17 of the hood.

A ventilator of the general type above described is particularly applicable to the roofs of road vehicles, and for this reason is liable to be injured or fouled by overhanging roadway objects such as tree branches, wires and the like. For the purpose of preventing such interference, the ventilator is provided with a guard consisting, in the construction illustrated, of a plate 31 adapted to be secured upon the vehicle roof in advance of the ventilator proper by means of bolts 32, which plate carries a pair of upwardly and rearwardly extending bars or rods 33, which terminate over and to the rear of the highest part of the ventilator proper. Since the cover plate 20 is inclined at its forward edge, and the cap portion 17 upon which it is mounted is also inclined or readily depressible, even when the vehicle is moving rapidly, injury to the hood equipped with the guard means disclosed is almost impossible.

The operation of the ventilator disclosed may be readily understood from the foregoing description. When the vehicle is at rest, the cap 17 of the hood is seated upon the lip 10c as shown in Fig. 2. When the vehicle is placed in forward motion, the impact of air against the vane 18 effects unseating of the cap 17. Due to the variable counterbalancing effect of the weights 25, the cap 17 may be raised to full open or horizontal position at low speeds. The inclination of the top edge of the stack 10 and the shape of the hood as a whole are conducive of high efficiency even at low speeds. The flange 18a of the vane 18 serves to prevent slippage of air beneath the vane surface proper as well as to strengthen the hood.

It will be appreciated that any draft of air upon the rear of the disclosed ventilator, whether due to a tail wind, or to backing of the vehicle, will but more tightly seat the cap portion 17, and leakage of rain into the vehicle through the ventilator is practically, if not absolutely, impossible. In this connection, attention may be called to the fact that the hood may be provided without the supplemental opening 21 and cover plate 20, and the term "closed" is used in its broad or comparative sense as applicable to a ventilator of the type disclosed. I am aware that numerous changes may be made in the embodiment of my invention herein illustrated and described, and I therefore claim my invention broadly as indicated by the appended claims.

What I claim is:

1. An automatic ventilator for exhausting foul air from vehicles comprising: an upstanding stack adapted for mounting upon the vehicle and provided with an air passage communicating with the interior of the vehicle, and a hood pivotally mounted upon said stack and including a cap portion normally seatable upon the top edge of said stack to close the air passage therethrough and a vane portion so associated with said cap portion and adapted for such disposition with respect to the normal line of motion of the vehicle as to be shiftable rearwardly by the impact of air through which the vehicle moves and effect unseating of said cap portion with respect to said stack when, and as long as, the vehicle is in motion.

2. An automatic ventilator for exhausting foul air from vehicles comprising: an upstanding stack adapted for mounting upon the vehicle and provided with an air passage communicating with the interior of the vehicle, and a hood pivotally mounted adjacent the forward edge of said stack and including a cap portion normally seatable upon the top of said stack to close the air passage therethrough and a vane portion so associated with said cap portion and adapted for such disposition with respect to the normal line of motion of the vehicle as to be shiftable rearwardly by the impact of air through which the vehicle moves and effect unseating of said cap portion with respect to said stack when, and as long as, the vehicle is in motion.

3. An automatic ventilator for exhausting foul air from vehicles comprising: an upstanding stack adapted for mounting upon the vehicle and provided with an air passage communicating with the interior of the vehicle, and a hood pivotally mounted adjacent the forward edge of said stack and including a cap portion normally seatable upon the top of said stack to close the air passage therethrough and a vane portion depending from said cap portion and adapted for disposition transverse the normal line of motion of the vehicle and shiftable rearwardly by the impact of air through which the vehicle moves effecting unseating of said cap portion with respect to said stack when, and as long as, the vehicle is in forward motion.

4. An automatic ventilator for exhausting foul air from vehicles comprising: upstanding stack adapted for mounting upon the vehicle and having its top edge inclined rearwardly with respect to the line of travel of the vehicle, and a hood pivotally mounted adjacent the forward edge of said stack and including a cap portion normally seatable upon the inclined top edge of said stack to close the air passage therethrough and a vane portion so associated with said cap portion and adapted for such disposition with respect to the normal line of motion of the vehicle as to be shiftable rearwardly by the impact of air through which the vehicle moves and effect unseating of said cap portion from the top edge of said stack and maintenance of said cap portion in a substantially horizontal plane when, and as long as, the vehicle is moving forwardly at a normal rate of speed.

5. An automatic ventilator for exhausting foul air from vehicles comprising: an upstanding stack adapted for mounting upon the vehicle and having its top edge inclined rearwardly with respect to the line of travel of the vehicle, and a hood pivotally mounted adjacent the forward edge of said stack and including a cap portion normally seatable upon the inclined top edge of said stack to close the air passage therethrough and a vane portion depending from said cap portion and adapted for disposition transverse the normal line of motion of the vehicle and shiftable rearwardly by the impact of air through which the vehicle moves to effect unseating of said cap portion with respect to said stack, and counterpoise means offsetting increased leverage of said cap portion and decreased leverage of said vane portion, thereby compensating for the tendency of the hood to progressively oppose uncovering of said stack passage.

6. An automatic ventilator for exhausting foul air from vehicles comprising: an upstanding stack adapted for mounting upon the vehicle and having its top edge inclined rearwardly with respect to the line of travel of the vehicle, and a hood pivotally mounted adjacent the forward edge of said stack and including a cap portion normally seatable upon the inclined top edge of said stack to close the air passage therethrough and a vane portion depending from said cap portion and adapted for disposition transverse the normal line of motion of the vehicle and shiftable rearwardly by the impact of air through which the vehicle moves to effect unseating of said cap portion with respect to said stack, and counterpoise means offsetting increased leverage of said cap portion and decreased leverage of said vane portion, thereby compensating for the tendency of the hood to progressively oppose uncovering of said stack passage, said counterpoise means comprising a weight, the lever distance of which increases as the cap portion of said hood approaches a horizontal plane.

7. An automatic ventilator for exhausting foul air from vehicles comprising: an upstanding stack adapted for mounting upon the vehicle and having its top edge inclined rearwardly with respect to the line of travel of the vehicle, and a hood pivotally mounted adjacent the forward edge of said stack and including a cap portion normally seatable upon the inclined top edge of said stack to close the air passage therethrough and a vane portion depending from said cap portion and adapted for disposition transverse the normal line of motion of the vehicle and shiftable rearwardly by the impact of air through which the vehicle moves to effect unseating of said cap portion with respect to said stack, and counterpoise means offsetting increased leverage of said cap portion and decreased leverage of said vane portion, thereby compensating for the tendency of the hood to progressively oppose uncovering of said stack passage, said counterpoise means comprising weights at each side of the hood forward of the pivotal hood mounting, said weights being swingingly mounted thereon in such relation to the hood and its pivotal mounting as to be increasingly effective in proportion to the angularity of said cap portion with respect to the horizontal.

8. An automatic ventilator for exhausting foul air from vehicles comprising: an upstanding stack adapted for mounting upon the vehicle and having its top edge inclined rearwardly with respect to the line of travel of the vehicle, and a hood pivotally mounted adjacent the forward edge of said stack and including a cap portion normally seatable upon the inclined top edge of said stack to close the air passage therethrough and a vane portion depending from said cap portion and adapted for disposition transverse the normal line of motion of the vehicle and shiftable rearwardly by the impact of air through which the vehicle moves to effect unseating of said cap portion with respect to said stack, and counterpoise means offsetting increased leverage of said cap portion and decreased leverage of said vane portion, thereby compensating for the tendency of the hood to progressively oppose uncovering of said stack passage, said counterpoise means comprising a threaded stud extending laterally outwardly from each side of said hood adjacent the upper edge of said vane, elongate counterweights having threaded bores extending partially therethrough adjacent their upper ends, said threadedly bored counterweights being threadedly associated with said studs and free to swing thereon, and stop means for limiting the rotation of said counterweights on said studs when once assembled.

9. An automatic ventilator for exhausting foul air from vehicles comprising: an upstanding stack adapted for mounting upon the vehicle and having its top edge inclined rearwardly with respect to the line of travel of the vehicle, and a hood pivotally mounted adjacent the forward edge of said stack and including a cap portion normally seatable upon the inclined top edge of said stack to close the air passage therethrough and a vane portion depending from said cap portion and adapted for disposition transverse the normal line of motion of the vehicle and shiftable rearwardly by the impact of air through which the vehicle moves to effect unseating of said cap portion with respect to said stack, and counterpoise means offsetting increased leverage of said cap portion and decreased leverage of said vane portion, thereby compensating for the tendency of the hood to progressively oppose uncovering of said stack passage, said counterpoise means comprising a threaded stud extending laterally outwardly from each side of said hood adjacent the upper edge of said vane, elongate counterweights having threaded bores extending partially therethrough adjacent their upper ends, said threadedly bored counterweights being threadedly associated with said studs and free to swing thereon, and stop means for limiting the rotation of said counterweights on said studs when once assembled, said stop means comprising depressible spring fingers secured at one end to the sides of said hood.

10. An automatic ventilator for exhausting foul air from vehicles comprising: an upstanding stack adapted for mounting upon the vehicle and provided with an air passage communicating with the interior of the vehicle, and a hood pivotally mounted upon said stack and including a cap portion normally seatable upon the top edge of said stack to close the air passage therethrough and a vane portion so associated with said cap portion and adapted for such disposition with respect to the normal line of motion of the vehicle as to be shiftable rearwardly by the impact of air through which the vehicle moves and effect unseating of said cap portion with respect to said stack when, and as long as, the vehicle is in motion, said cap comprising a main plate seatable upon the top edge of said stack, said plate having an aperture therein alined with the air passage of said stack and a supplemental cover plate superposed in spaced relation with respect to said main plate and permitting air passage through said aperture and beneath said supplemental cover plate when the cap is seated upon said stack yet precluding the entry of rain or foreign matter into said stack.

11. An automatic ventilator for exhausting foul air from vehicles comprising: an upstanding stack adapted for mounting upon the vehicle and provided with an air passage communicating with the interior of the vehicle, a hood hinged upon said stack adjacent its forward edge and including a cap portion normally seatable upon the top edge of said stack to close the air passage therethrough and a vane portion so associated with said cap portion and adapted for such disposition with respect to the normal line of motion of the vehicle as to be shiftable rearwardly by the impact of air through which the vehicle moves and effect unseating of said cap portion with respect to said stack when, and as long as, the vehicle is in motion, and automatic lubricating means for the hinging portion of said hood, said means comprising an oil saturated felt strip, means for holding said strip upon the upper surface of said cap portion directly over said hinging portion, perforations in said cap portion directly beneath said felt strip, and a cover plate shielding said strip from rain and rays of the sun.

12. An automatic ventilator for exhausting foul air from vehicles comprising: an upstanding stack adapted for mounting upon the vehicle and provided with an air passage communicating with the interior of the vehicle, a hood pivotally mounted upon said stack and including a cap portion normally seatable upon the top edge of said stack to close the air passage therethrough and a vane portion so associated with said cap portion and adapted for such disposition with respect to the normal line of motion of the vehicle as to be shiftable rearwardly by the impact of air through which the vehicle moves and effect unseating of said cap portion with respect to said stack when, and as long as, the vehicle is in motion, and means for guarding said hood against overhanging tree branches and the like, comprising a plate disposed forward of said vane and upwardly and rearwardly extending bars terminating at their upper ends above and to the rear of the highest part of said hood.

WALKER L. C. HUXTER.